US007689939B1

(12) United States Patent  
Becker

(10) Patent No.: US 7,689,939 B1
(45) Date of Patent: Mar. 30, 2010

(54) SOFTWARE APPLICATION BREAK THROUGH A SCREEN BLANKER

(75) Inventor: Gary Becker, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 723 days.

(21) Appl. No.: 10/882,889

(22) Filed: Jun. 30, 2004

(51) Int. Cl.
*G06F 3/048* (2006.01)
(52) U.S. Cl. .................................... 715/867; 340/7.21
(58) Field of Classification Search ................. 715/867
See application file for complete search history.

(56) References Cited

U.S. PATENT DOCUMENTS

| 5,059,961 | A |   | 10/1991 | Cheng .................... 340/720 |
| 5,448,262 | A |   | 9/1995 | Lee et al. ................. 345/212 |
| 5,483,464 | A |   | 1/1996 | Song ....................... 364/492 |
| 5,566,388 | A |   | 10/1996 | Brame et al. ............. 370/95.1 |
| 5,586,333 | A |   | 12/1996 | Choi et al. ............... 395/750 |
| 5,594,784 | A |   | 1/1997 | Velius ................... 379/88.02 |
| 5,668,854 | A |   | 9/1997 | Minakami et al. ....... 379/88.18 |
| 5,745,105 | A |   | 4/1998 | Kim ......................... 345/212 |
| 5,787,152 | A |   | 7/1998 | Freadman ............... 379/88.01 |
| 5,924,046 | A |   | 7/1999 | Martensson ............. 455/567 |
| 5,974,043 | A |   | 10/1999 | Solomon ................. 370/352 |
| 5,974,551 | A |   | 10/1999 | Lee ......................... 713/300 |
| 6,006,335 | A |   | 12/1999 | Choi et al. ............... 713/310 |
| 6,009,151 | A |   | 12/1999 | Staples .................. 379/90.01 |
| 6,076,169 | A |   | 6/2000 | Lee ......................... 713/320 |
| 6,108,028 | A | * | 8/2000 | Skarbo et al. ............ 348/14.03 |
| 6,145,083 | A | * | 11/2000 | Shaffer et al. ................ 726/7 |
| 6,288,715 | B1 | * | 9/2001 | Bain et al. ................. 345/211 |
| 6,327,476 | B1 |   | 12/2001 | Koscal ..................... 455/462 |
| 6,353,449 | B1 | * | 3/2002 | Gregg et al. .............. 715/762 |
| 6,366,653 | B1 |   | 4/2002 | Yeh et al. ................. 379/93.05 |
| 6,381,309 | B1 |   | 4/2002 | Tremblay .................... 379/52 |
| 6,384,853 | B1 | * | 5/2002 | Shaffer et al. .............. 715/867 |
| 6,449,269 | B1 |   | 9/2002 | Edholm .................... 370/352 |
| 6,453,020 | B1 |   | 9/2002 | Hughes et al. .......... 379/88.04 |
| 6,470,077 | B1 |   | 10/2002 | Chan ....................... 379/88.01 |

(Continued)

FOREIGN PATENT DOCUMENTS

DE          19813179          9/1999

(Continued)

OTHER PUBLICATIONS fonXL Call Displaly Screen Saver web pages, 2001, pp. 1-3.*

(Continued)

*Primary Examiner*—Weilun Lo
*Assistant Examiner*—Tuyetlien T Tran
(74) *Attorney, Agent, or Firm*—Sheridan Ross P.C.

(57) ABSTRACT

The present invention is directed to a personal computer that includes: a display device 316 for displaying image information and a processor 312 operable when the display device 316 is in a screen saver mode to (a) receive, from an application, at least part of which is executing on the personal computer 216, notification of the occurrence of an event; (b) determine if the event is a member of a defined set of events; and (c) when the event is a member of the defined set of events, display on the display image information associated with the event, wherein the displaying function occurs while the display is in the screen saver mode.

35 Claims, 5 Drawing Sheets

U.S. PATENT DOCUMENTS

| | | | |
|---|---|---|---|
| 6,633,316 B1 | 10/2003 | Maddalozzo, Jr. et al. | 345/854 |
| 6,633,318 B1 | 10/2003 | Kim et al. | 345/867 |
| 6,650,751 B1 | 11/2003 | Becker | 379/424 |
| 6,678,374 B1 | 1/2004 | Becker | 379/377 |
| 6,697,456 B2 | 2/2004 | Chan et al. | 379/88.03 |
| 7,185,292 B2 * | 2/2007 | Pinsky et al. | 715/867 |
| 2002/0051188 A1 | 5/2002 | Kim | 358/1.15 |
| 2002/0071424 A1 | 6/2002 | Chiu et al. | 370/352 |
| 2002/0196294 A1 * | 12/2002 | Sesek | 345/867 |
| 2004/0041849 A1 * | 3/2004 | Mock et al. | 345/867 |
| 2004/0075701 A1 * | 4/2004 | Ng | 345/867 |

FOREIGN PATENT DOCUMENTS

| | | |
|---|---|---|
| WO | WO 98/30007 | 7/1998 |
| WO | WO 00/35179 | 6/2000 |
| WO | WO 00/67452 | 11/2000 |

OTHER PUBLICATIONS

Nortel Multimedia PC Client User Guide, Dec. 2003.*

"A Telephone Adapter for Internet Telephony Systems"; *Microphrecessors and Microsystems, IPC Business Press Ltd. London, GB*; vol. 21, No. 4, Dec. 40, 1997; pp. 213-221.

Bernhard Seefeld's Blog: Aug. 2003 Archives (Aug. 2003), available at http://www.bernhardseefeld.ch/archibes/2003 08.html, 5 pages.

Clarisys website, "Welcome to Clarisys! I750Headset Ready" (2004), available at http://www.clarisys.com/, 2 pages.

Clarisys, A Division of CommuniTech brochure entitled "Claritel i750 USB Internet Phone," (undated), 2 pp.

Microsoft Windows Technologies, "Windows NetMeeting: Features," (Apr. 22, 2004), available at http://www.microsoft.com/windows/NetMeeting/Features/default.ASP, 2 pp.

Microsoft Windows Technologies, "Windows NetMeeting: System Requirements," (Dec. 21, 2000), available at http://www.microsoft.com/windows/NetMeeting/SystemRequirements/default.ASP, 1 p.

Microsoft Windows Technologies, "Windows NetMeeting: Business Users," (Oct. 30, 2003), available at http://www.microsoft.com/windows/NetMeeting/Corp/default.ASP, 1 p.

LinuxGuruz, "Screen Saver," (1999-2004), available at http://www.linuxguruz.com/foldoc/foldoc.php?screen+blanker, 2 pp.

* cited by examiner

US 7,689,939 B1

SOFTWARE APPLICATION BREAK THROUGH A SCREEN BLANKER

FIELD OF THE INVENTION

The invention relates generally to screen blankers and particularly to an application communicating with a user when a screen blanker is activated.

BACKGROUND OF THE INVENTION

An IP softphone includes a software package running on a Personal Computer (PC). An example of such an IP softphone is the Avaya IP Softphone™ manufactured by Avaya Inc. The software emulates a telephone and communicates signaling and voice information via an IP-network connection between the PC and a telecommunication switching system (also referred to as a Private Branch Exchange or PBX). This network connection is often the Internet or a Local Area Network or LAN. Audio information being received from the network is communicated with the user via a headset or handset by means of a sound card that interfaces the headset or handset to the PC. When a user speaks, the sound card converts the analog information to digital information that the software then transmits to a destination via the network. When a call is received via the network for the IP softphone, the software alerts the user via an internal or external speaker attached to the PC.

With reference to the Avaya IP Softphone™ display 100 of FIG. 1A, the user may answer the call by selecting the softphone software application (such as by clicking on the corresponding icon 104 of FIG. 1B) and selecting a button 108 labeled "answer". Before and after the call is answered, the caller's name and number, if available, is depicted in display field 112. The user then conducts a conversation with the caller via either the handset or the headset. When the call is answered, the display changes automatically to the display 120 of FIG. 1D, which includes buttons for drop 124, hold 128, transfer 132, conference 136, and hangup 140. The call is terminated by the called user by selecting the hangup button 140. With reference to the Avaya IP Softphone™ display 150 of FIG. 1C, to place a call the user once again selects the software and selects a soft button 154 labeled "Number" and proceeds to dial the destination number using a keypad or a pre-stored list of telephone numbers. The number appears in the field 158. The keypad can be either a soft keypad or the PC's keyboard.

A common problem is that a user may be unable to answer an incoming Voice over IP or VoIP call when a password protected screen blanker is activated on the PC. As will be appreciated, a "screen blanker" or "screen saver" is a program that automatically blanks the screen of a computer (or blanks image data from the monitor) and/or displays a selected image or collection of images, such as a moving picture, (or changes the state of the screen) when the computer has not been used or has been idle for a selected period of time and the monitor remains activated. Screen savers can not only prolong the useful lives of certain types of monitors but also prevent secret information from being divulged to others by virtue of the information being continuously displayed even when the displayed information is not currently in use. When the user hears the IP softphone ringing, the user must unlock the screen blanker (typically by inputting a selected set or sequence of characters including or followed by a password) to access the PC, select the software application, and activate the soft button labeled "Answer". Only after completing these time-consuming steps can the user pick up his handset or put on his headset and talk. Frequently, before the user has completed these steps, the call is transferred to coverage, such as a voice mail system, or the caller has concluded that the user is not present and terminated the call.

One solution is incorporated in the Clarisys i750 USB Internet Phone™. The solution has an On/Off Hook button built into the handset. When the user presses that button to go off-hook, the handset signals to the IP Softphone software via the USB port. A ringing call be answered even though the password protected screen blanker is activated. When the password protected screen blanker is engaged, this solution does not allow the user to read the calling party number before deciding whether to answer the call. This solution further requires custom hardware. The solution works only for voice calls and not for instant messaging calls.

Another solution is incorporated into Microsoft Netmeeting™. The software attempts to solve the problem by having an option referred to as "call, automatically accept calls." Utilizing this option, the user need only start listening and talking to participate in the call. The disadvantage of this option is that a call is always answered whether or not the user is available or not. This can lead to a great deal of caller frustration, wasted time, and/or expense (due to toll charges) until the caller determines from the resulting silence that "nobody" has answered the call. This solution also prevents the call from going to coverage, thereby preventing some one else or a voice mail system from taking a message if the called party is not present.

SUMMARY OF THE INVENTION

These and other needs are addressed by the various embodiments and configurations of the present invention. The invention is directed to a personal computer able to modify automatically a screen saver in response to the occurrence of one or more selected events. A "personal computer" refers to a computer designed to be used by only one person at any one time, whether at home or in a business setting. A personal computer includes desk top and laptop computers.

In one embodiment, a method is provided that includes the steps of:

(a) when the display is in a screen saver mode, receiving, from an application, at least part of which is executing on the personal computer, notification of the occurrence of an event;

(b) determining if the event is a member of a defined set of events; and (c) when the event is a member of the defined set of events, displaying on the display (while the display is in the screen saver mode) image information associated with the event.

The event can be any event generated by an application running on the personal computer, such as receipt of an incoming communication from a third party for a user of the personal computer, receipt of an outgoing communication from the user to the third party, and receipt of a reminder of a (previously) scheduled event. Typically, the communication is a real time communication. A "real time" communication refers to a communication exchanged between two parties while both parties are on line or off hook. Real time communications include without limitation voice calls, video calls, instant messages, and text chat messages.

When the event is receipt of a communication, the screen saver typically runs normally when the communication device is not receiving a communication (e.g., is not in the ringing state). When the communication device is receiving the communication, a graphical user interface associated with the communication application is displayed to permit the user to answer the communication without first disabling or terminating the screen saver mode. No other software application may be accessed while the display is in the screen saver mode. If the incoming graphical user interface or communication is terminated before it is answered, the PC no longer displays the application GUI through the screen saver mode. This ability to break automatically through even a password-protected screen saver is optional so that a user who wants to prevent unauthorized users from answering communications while the user is away from his desk can do so simply by disabling the interrupt or break through feature of the screen saver application.

In another configuration, the graphical user interface is continuously visible even when the password-protected screen saver is engaged. As noted, no other software applications can be accessed while the password-protected screen saver is engaged.

The logic for the embodiment can be embodied as a logic circuit and/or as computer executable instructions stored on a computer readable medium.

The present invention can have other advantages. It can permit a user to receive any real-time communication, including not only voice calls but also SIP instant messages while the screen saver is operational. It can allow users to read the contacting party's number before deciding whether or not to answer a communication. It can allow for limited calling with specified call permissions (or limited calling to specified destinations) while the PC is password protected. It can be configured not to interfere with incoming communications from going to coverage.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
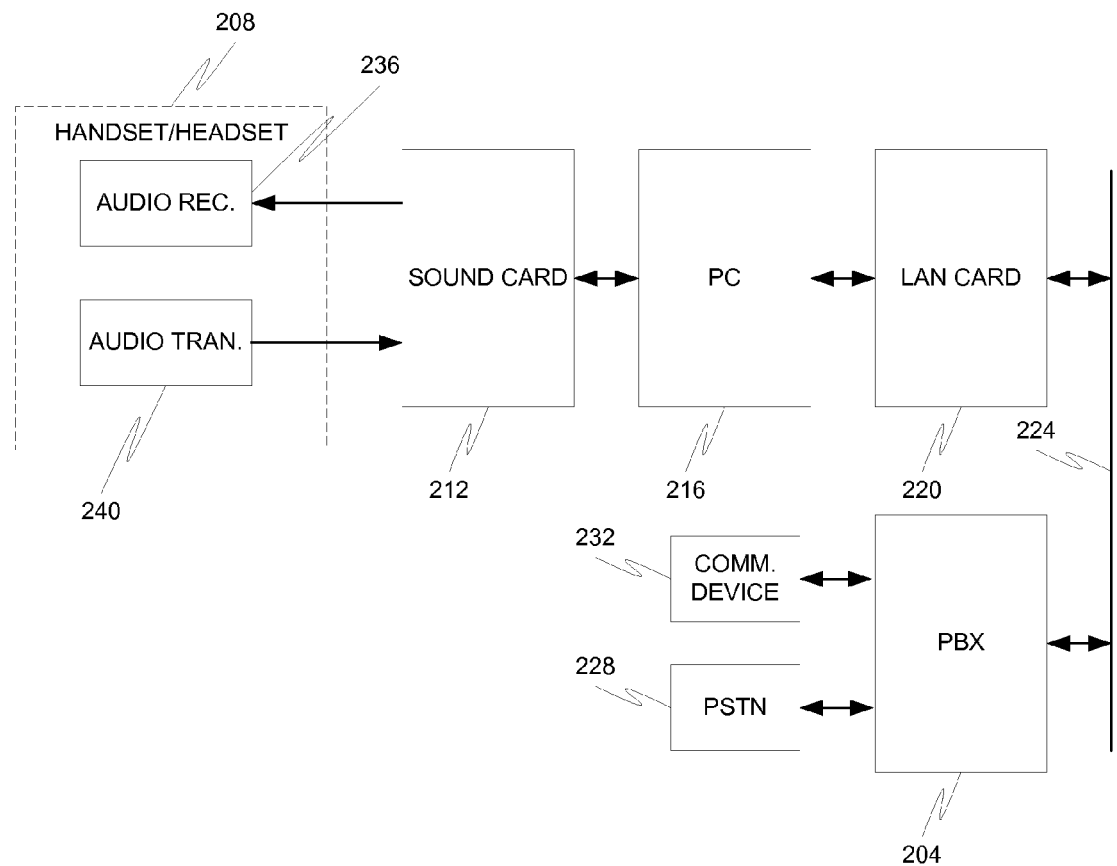
FIG. 2 is a block diagram depicting an architecture according to a first embodiment of the present invention.

FIG. 2 illustrates a system 200 according to a first embodiment of the invention. With reference to FIG. 2, PBX 204 is supplying telephone service for a user that is utilizing handset/headset 208 via sound card 212, Personal Computer (PC) 216, Local Area Network or LAN card 220, and LAN 224. PBX 204 supplies access to the general public by being interconnected to public telephone network 228. One skilled in the art will readily see that the LAN card 220 and sound card 212 could be internal to the PC 216. PBX 204 can be any switch/server, such as an Avaya Definity Business Communication Switching System™.

While a PBX 204 is illustrated in FIG. 2, one skilled in the art will readily envision that PBX 204 could be any of a variety of switching equipment. For example, PBX 204 could be a Public Switching Telephone Network (PSTN) gateway box in an H.323 calling system.

PBX 204 supplies service for other users utilizing a conventional communication device 232, such as a telephone. Additionally, other handsets/headsets similar to handset/headset 208 can be interconnected to LAN 224 by having individual sound cards, PC's, and LAN cards. PC 216 receives control signaling and voice information from the PBX 204, and PC 216 in turn transmits voice information and control signaling information to PBX 204 via LAN card 220 and LAN 224.

Sound card 212 performs the function of converting audio information received from PC 216 to analog signals and transmitting those to audio receiver 236 (that may be a simple speaker arranged in handset/headset 208). Sound card 212 similarly converts audio information from audio transmitter 240 (that may be a simple microphone) to digital information, which is transmitted to PC 216.

Other software applications in PC 216 emulate a telephone with respect to PBX 204 with the exception that PBX 204 is transmitting and receiving information via LAN 224 rather than a telephone link. Sound card 212, PC 204, and LAN card 220 are of conventional design well-known to those skilled in the art.

Figure 3:
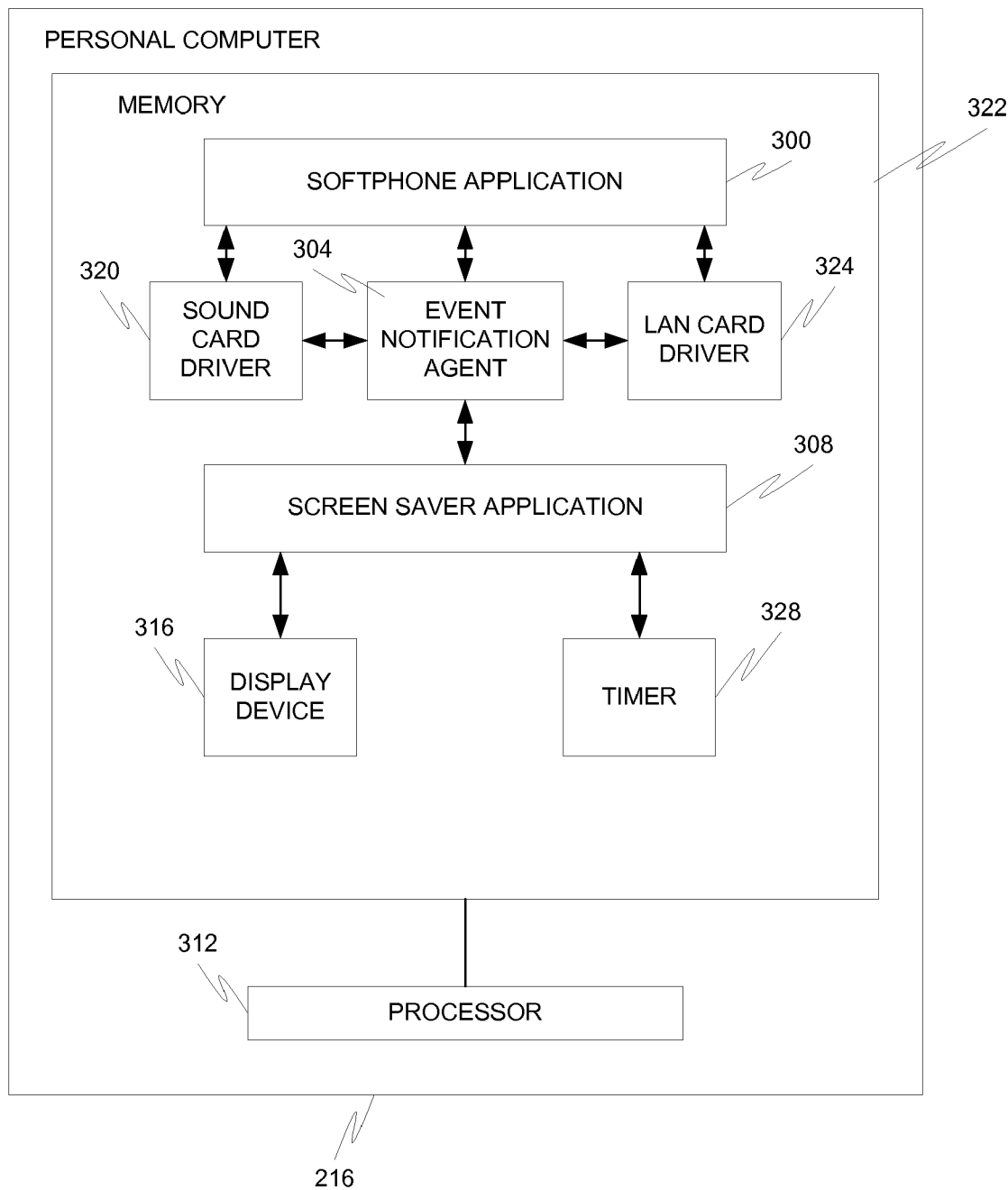
FIG. 3 is a block diagram depicting an architecture according to the first embodiment.

When an incoming communication is received by softphone application intended for the user/subscriber of the PC 216, an event notification agent 304 (FIG. 3) is notified, which in turn notifies a screen saver application 308 (FIG. 3). As will be appreciated, the screen saver application 308 typically is software that may form part of the PC operating system, is stored in the PC's hard disk, and is loaded in the main memory of the PC, when the PC is booted, to be executed by the control of the processor 312. In response, the screen saver application 308 causes the GUI of the softphone application, such as the GUI of FIGS. 1A and 1B, to be displayed by the display device 316 (FIG. 3), even though the display device is still in screen saving mode. As will be appreciated, when the device is in screen saving mode the ability of the user to access/enable other software applications, such as those stored in PC 216, is restricted.

Although the discussion of the first embodiment is made with respect to live voice communications, it is to be understood that other real time communication modalities may also be used with the concepts of the present invention. For example, the communication may be an instant message or text chat message with the PC 216 including an instant messaging or text chat application (not shown). In that event PBX 204 would be a multi-media server in an instant messaging or text chat system, and PSTN 228 would be a data network, such as the Internet.

FIG. 3 depicts, in block diagram form, the structure of the software instructions stored in the memory 322 (or a computer readable medium) of the PC 216 and executed by the processor 312 to provide functions for the handset or for the headset and for the display device 316. The messages transmitted among the software elements or modules 300, 320, 304, 324, and 308 and hardware elements 316 and 328 are conveyed via a standard operating system not illustrated in FIG. 3. Drivers 320 and 324 provide the standard software interface to sound card 212 and LAN card 220, respectively. Such drivers are well-known to those skilled in the art. Softphone application 300 provides the overall control of the communication of calls with PBX 204. Screen saver application 308 provides the overall control of the display device 316 as discussed below. The event notification agent 304 provides the interface between the softphone and screen saver applications 300 and 308.

When the control information is received from PBX 204 indicating that there is an incoming communication, the information is relayed from LAN card driver 324 to the softphone application 300. The softphone application 300 then initiates sound card driver 320 to produce a ringing sound on the internal or external speaker of PC 216. In addition, the softphone application 300, concurrently or immediately before or after, notifies the event notification agent 304 of the incoming communication. As will be appreciated, the PBX 204 or LAN card driver 220 may directly notify the event notification agent 304 of the incoming communication. When the display device 316 is in screen saving mode, the screen saver application 308, in response, changes the current display of the display device 316 to include or be replaced by a display including the softphone GUI. The user may perform normal softphone operations permitted by the selected GUI display and its related children displays without the operations being blocked by the screen saver application. For example, for voice and instant messaging applications the user may answer the communication, drop the communication, place the communication on hold, transfer the communication, conference in other parties, hangup or terminate the communication, send and receive voice or nonvoice communications, view the communications, and the like.

When the communication is answered, the softphone application 300 interacts with the PBX 204 to exchange the necessary control information so that the communication can be completed. The communication between the calling and called endpoints takes place in a normal manner by the user of the handset/headset 208, hearing speech from the user of the communication device 232 via audio receiver 236 and speaking to the user of the communication device 232 via the audio transmitter 240. When the communication is terminated, such as by the user, with reference to FIG. 1D, selecting the button 140 labeled "Hangup", the softphone application 300 transmits a disconnect message to PBX 204 to cause the communication to be terminated and event notification agent 304 to cause the display of the display device 316 to be returned to the original screen saver display. In response, the display remains in the screen saving mode, notwithstanding the receipt of commands by the application from the user via the softphone/instant messaging application. In this manner, a party cannot call the user at the PC thereby providing access to the PC's applications including the communication application, and then freely access information on the PC, such as conduct communications, at the user's expense, via the communication application's GUI.

Figure 4:
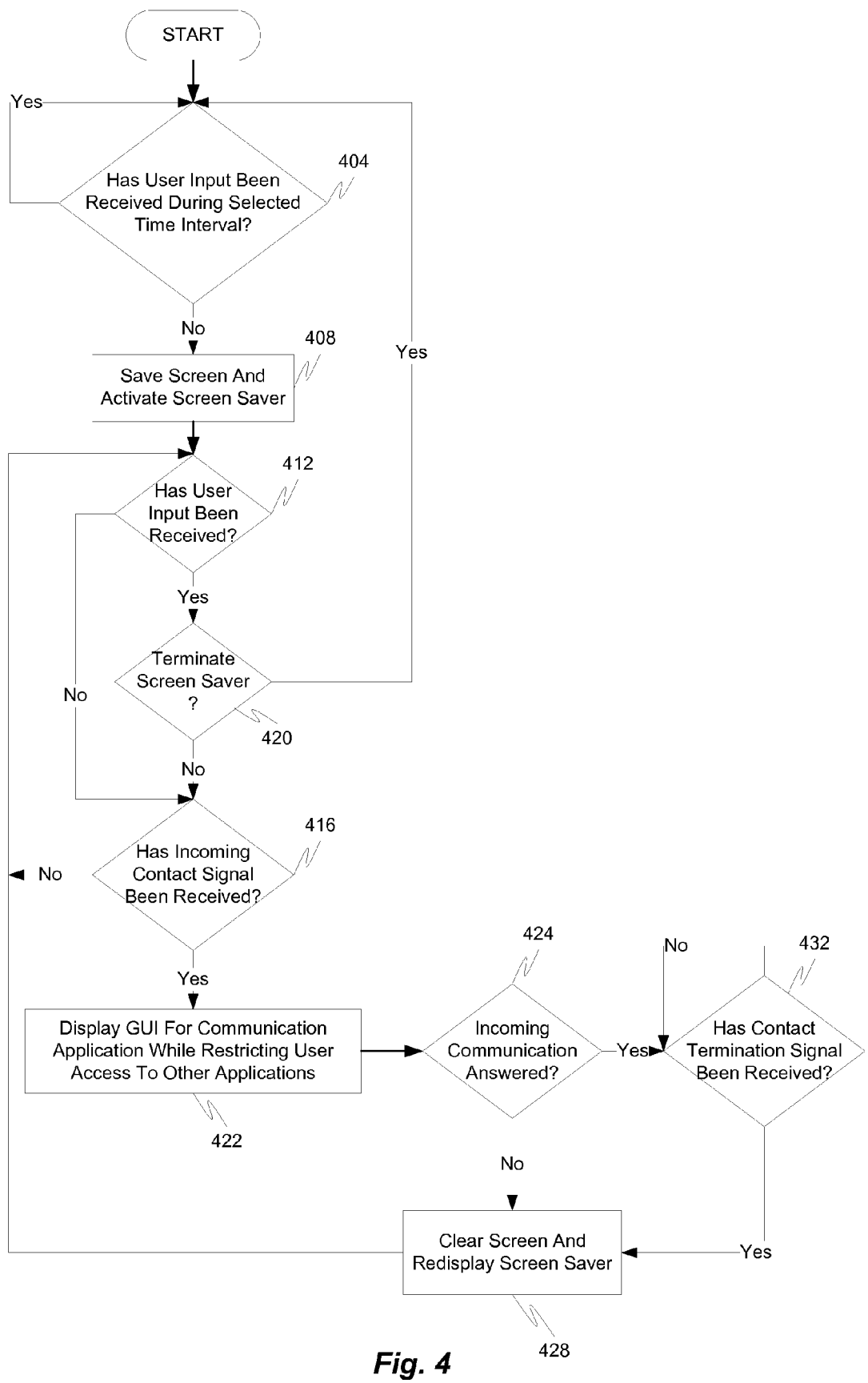
FIG. 4 is a method of operation of the event notification agent according to a second embodiment of the present invention.

The collective operation of the event notification agent 304 and screen saver application 308 will now be described with reference to FIG. 4.

In step 400, it is assumed that the PC 216 is activated and therefore is not currently in screen saver or blanker mode. As will be appreciated, when the PC is in this mode the PC user is unable to access a defined set of applications unless specified input, typically a password, is received from the user.

In decision diamond 404, the screen saver application 308 determines whether or not user input has been received during the selected time interval. The selected time interval typically is from about 1 to about 10 minutes. If so, the application 308 repeats decision diamond 404 after a suitable time interval. If not, the application 308 proceeds to step 408 and saves the information in the currently displayed screen and activates the screen saver display.

In next decision diamond 412, the application 308 determines whether the PC user has inputted defined information. When no user input has been received, the application proceeds to decision diamond 416 (discussed below). When user input has been received, the application proceeds to decision diamond 420.

Figure 5:
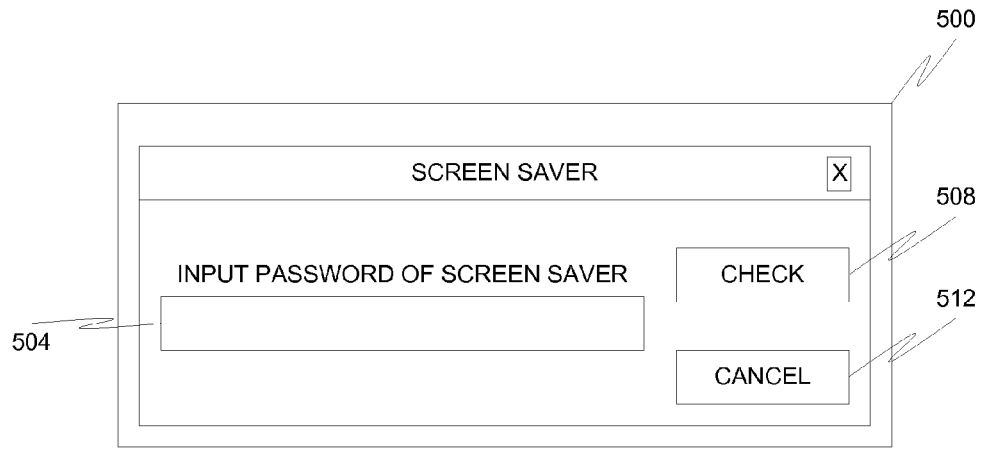
FIG. 5 is a conventional screen saver display.

In decision diamond 420, the application 308 determines, based on the input, whether or not to terminate the screen saver display. When the input is defined information, the display is terminated, and the application repeats decision diamond 404 after a selected time. The defined information is typically a password but can include other information, such as a specified sequence of keystrokes (e.g., simultaneous depression of the control (ctrl), alt, and delete keys) optionally followed by the password. In one configuration, the user inputs specific keys to replace the screen saver display with that of FIG. 5. The display 500 of FIG. 5 provides the user with a password field 504 for entry of the password and optional check and cancel icons 508 and 512.

When the input is not the defined information, the application 308, in decision diamond 416, determines if an incoming communication or contact notification has been received from the event notification agent 304. If not, the application repeats decision diamond 412 at a specified time interval. If so, the application, in step 422, displays the GUI for the communication application (e.g., softphone or instant messaging application) (without receiving the defined information from a user) but continues to restrict the user's access to a defined set of applications.

In next decision diamond 424, the application 308 determines whether or not the incoming communication has been answered. When the communication is not answered within a selected time, proceeds to call coverage, or is terminated by the caller, the application 308 proceeds to step 428 (discussed below). When the communication is answered, communications are exchanged between the connected parties via the enabled softphone application 300.

In next decision diamond 432, the application 308 determines whether a contact termination notification has been received from the notification agent 304. Decision diamond 432 is repeated at periodic intervals until the signal is received. When the notification is received, the application proceeds to step 428.

In step 428, the application 308 removes the softphone GUI display from or otherwise clears the screen of the display device 316 and redisplays the screen saver display. The application 308 then repeats decision diamond 412.

A number of variations and modifications of the invention can be used. It would be possible to provide for some features of the invention without providing others.

Figure 1A:
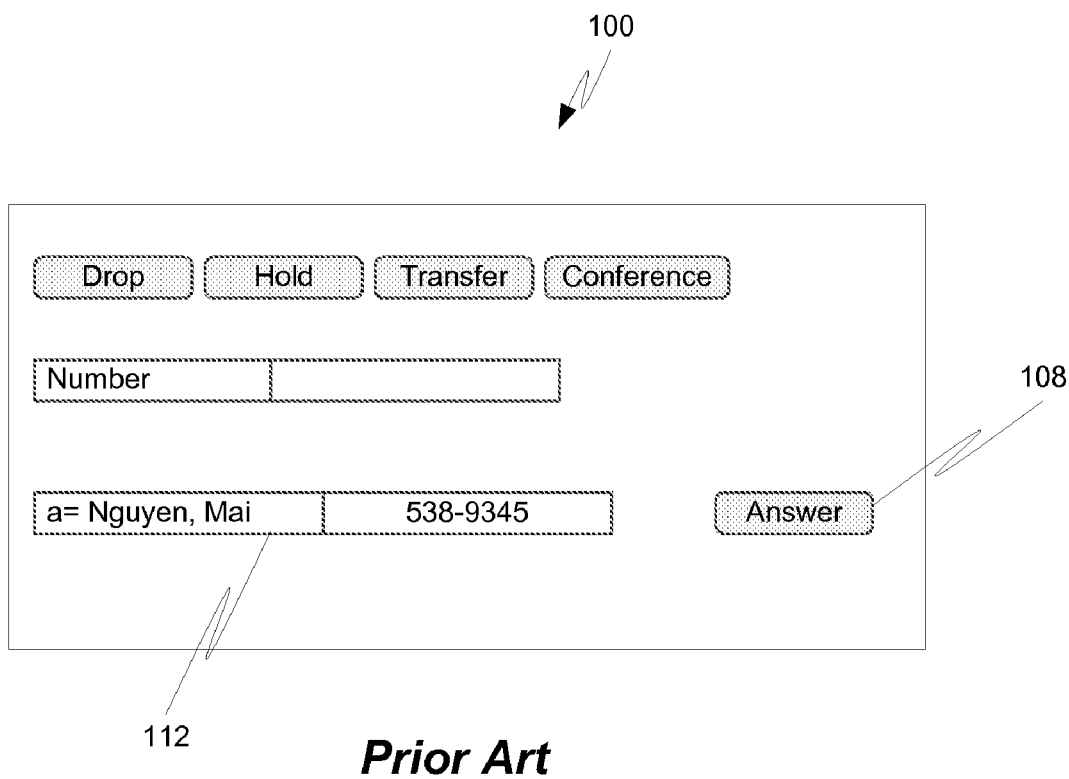
FIGS. 1A-D depict various Graphical User Displays or GUI's for a conventional softphone application.
Figure 1B:
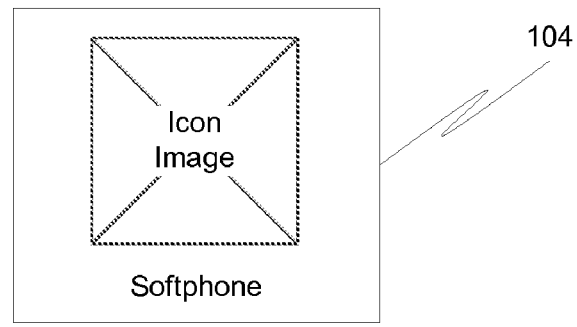
Figure 1C:
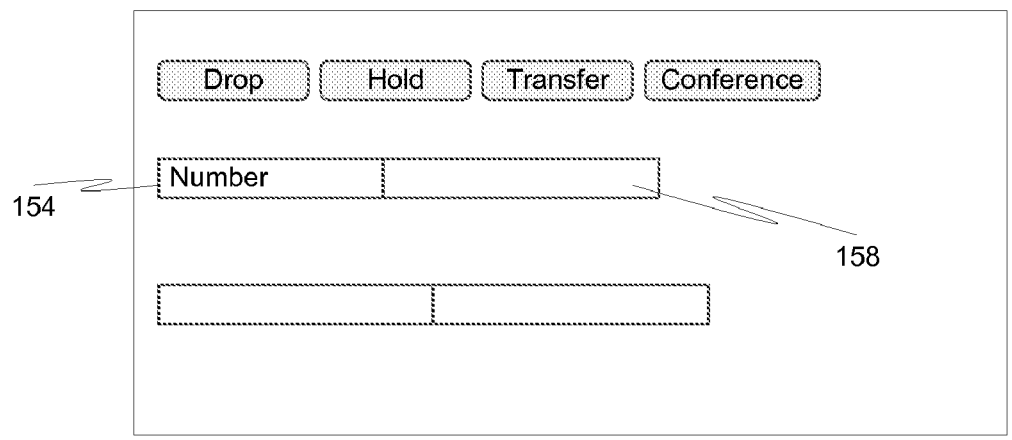
Figure 1D:
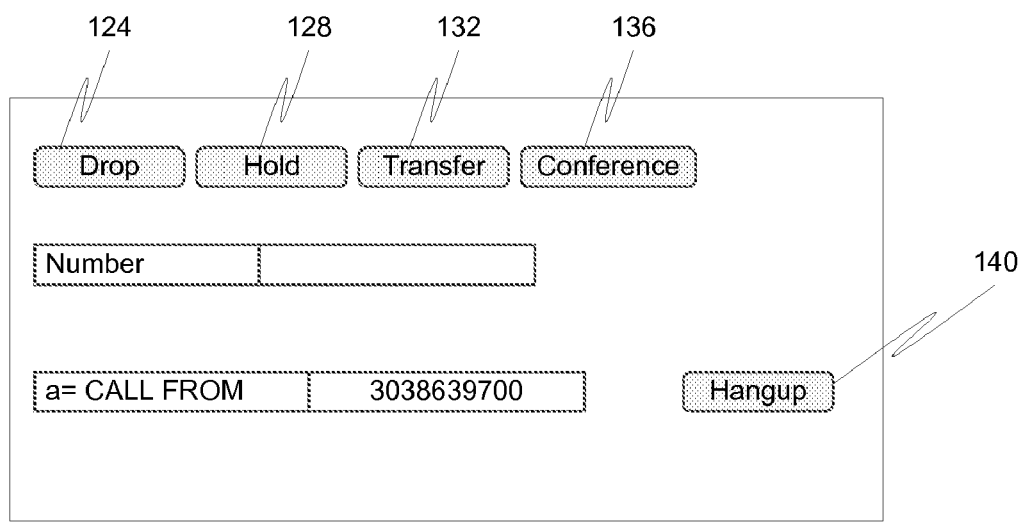

For example in one alternative embodiment, the GUI display of the communications application, such as the display of FIG. 1A or 1C, (or an icon, such as that of FIG. 1B, associated with the display) is always visible on the screen saver display. The user may freely access all of a restricted set of the features of the communications application to accept incoming or place outgoing contacts or otherwise conduct communications; however, the user is prevented from accessing other applications on the PC. For example, the incoming GUI display, such as that of FIG. 1A, can be displayed to permit only incoming communications to be answered but the user restricted from making or initiating outgoing communications. Alternatively, the outgoing GUI display, such as that of FIG. 1C, can be displayed to permit both incoming communications to be received and outgoing communications to be placed. To prevent unauthorized use of the communications application to make outgoing communications, the communications application may be enabled for a specified or defined set of telephone numbers or electronic addresses unless the screen saver is terminated. The defined set of telephone numbers (or calling permissions) could include the numbers of emergency calls, such as 911 calls, calls to building security, and/or toll-free or local calls. A user may not be concerned about unauthorized people answering incoming calls through the continuously displayed communication application's GUI, because callers can generally detect or identify the answering party as being unauthorized (or someone other than the intended called party). Alternatively, the icon 104 related to a communication application GUI display may be displayed through the screen saver. Users may want less than a full or nearly full screen format to avoid marring the appearance of the screen saver display. In the event that an incoming call arrives, the icon would automatically be replaced by the incoming communication GUI display, and automatically change back to the icon display if the communication is not answered, proceeds to coverage, or is terminated by the calling party.

In another embodiment, the event notification agent 304 monitors for events other than the arrival of an incoming communication. The events would be generated by an application running on the PC. For example, calendering or scheduling software, such as Microsoft Outlook™ or an email application, can generate reminders that are to be displayed to the PC user. Normally, the reminders are blocked by the screen saver. When the event notification agent detects the occurrence of such an event 304, the agent would cause the screen saver display to be altered to include the display associated with the event or an icon associated therewith. The altered display could be replaced automatically by the full screen saver display after a selected period of time.

In another alternative embodiment, some of the functions of the screen saver application are included within a module other than the application itself, such as the event notification agent and/or communication application. For example, another module can perform steps 416, 420, 424, 432, and/or 428 and issue appropriate requests/commands to the application. This embodiment is particularly attractive as existing screen saver applications, which are typically included within PC operating systems, do not require replacement.

In another embodiment, the various software components are embodied in whole or part in a logic circuit, such as Application Specific Integrated Circuit or ASIC.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of effecting a communication on a communication application, at least a portion of which is executing on a personal computer having a display, comprising:
   (a) when the display is in a password protected screen saver mode, providing, by the personal computer, a communication application display, the communication application display permitting a user to perform, via the display, a plurality of the following operations:
      (A1) place an active live voice communication on hold;
      (A2) transfer an active live voice communication to another communication device;
      (A3) conference at least one other communication device into an active live voice communication over the Public Switched Telephone Network to a third party; and
      (A4) place an outgoing and nonemergency call over the Public Switched Telephone Network to a third party;
   (b) while the display is in the password protected screen saver mode, receiving, from the user, a selection of at least one of operations (A1)-(A4); and
   (c) while the display is in the password protected screen saver mode, performing, by the personal computer, the selected at least one operation, wherein the user is not logged into the personal computer during the performance of steps (a)-(c) and wherein, when a command is received from the user to disable break through by the communication application while the display is in the password protected screen saver mode, prohibiting the performance of steps (a)-(c).

2. The method of claim 1, wherein the user selects operation (A1).

3. The method of claim 1, wherein the user selects operation (A2).

4. The method of claim 1, wherein the user selects operation (A3).

5. The method of claim 1, wherein the user selects operation (A4) and wherein the user is able to answer, via the display while the display is in the password protected screen saver mode, an incoming live voice communication from a third party for the user.

6. The method of claim 1, wherein the user selects operation (A4) and wherein the user is able to place, via the display while the display is in the password protected screen saver mode, a non-emergency, at least one of (i) a toll-free and long distance and (ii) a local live voice communication over the Public Switched Telephone Network (PSTN) to a third party.

7. The method of claim 1, wherein, while the display is in the password protected screen saver mode, the user is prevented from accessing, via the personal computer, at least one application other than the communication application.

8. The method of claim 1, wherein, when the display is not in the password protected screen saver mode, the communication application is enabled to perform a first set of operations and wherein, when the display is in the password protected screen saver mode, the communication application is enabled to perform the first set of operations.

9. The method of claim 1, wherein a password protected screen saver display is modified to include the communication application display in response to input from the user.

10. The method of claim 1, wherein the communication application display is continuously displayed while the display is in the password protected screen saver mode.

11. The method of claim 1, further comprising:
   (d) while the display is in the password protected screen saver mode, audibly alerting the user to an incoming live voice communication; and
   (e) while the display is in the password protected screen saver mode, displaying the display of the communication application to permit the user to answer the incoming live voice communication without first disabling the password protected screen saver mode.

12. The method of claim 11 wherein, when the user fails to answer the incoming live voice communication, ceasing the display of the communication application display in lieu of a password protected screen saver display and directing the incoming live voice communication to call coverage.

13. The method of claim 1, wherein step (a) comprises the substeps:
   (i) while the display is in the password protected screen saver mode, determining whether or not defined information is inputted by the user;
   (ii) when the defined information is not inputted by the user, determining whether or not an incoming live voice communication for the personal computer has been received;
   (iii) when an incoming live voice communication for the personal computer is received and when the display is in the password protected screen saver mode, alerting, by the personal computer, the user to the incoming live voice communication; and
   (iv) when the defined information is inputted by the user, terminating the password protected screen saver mode, wherein the defined information is a password.

14. A computer readable medium encoded with processor executable instructions operable, when executed by the processor to perform the steps of claim 1.

15. A method of effecting a communication by a communication application, at least a portion of which is executing on a personal computer having a display, comprising:
   (a) when the display is in a password protected screen saver mode, providing, by the personal computer, a communication application display, the communication application display permitting a user to perform, via the display, a first set of operations, the first set of operations being the same as a second set of operations permitted by the communication application when the display is not in the password protected screen saver mode and including at least one of placing an active live voice communication on hold; transferring an active live voice communication to another communication device; and conferencing at least one other communication device into an active live voice communication;
   (b) while the display is in the password protected screen saver mode, receiving, from the user, a selection of at least one member of the first set of operations; and
   (c) while the display is in the password protected screen saver mode, performing the selected at least one operation wherein the user is not logged into the personal computer during the performance of steps (a)-(c) and wherein, when a command is received from the user to disable break through by the communication application while the display is in the password protected screen saver mode, prohibiting the performance of steps (a)-(c) and wherein the first and second sets of operations each comprise the following operations:
   (i) answer an incoming live voice communication from a third party for the user;
   (ii) place an active live voice communication on hold;
   (iii) transfer an active live voice communication to another communication device;
   (iv) conference at least one other communication device into an active live voice communication; and
   (v) place at least one of (i) a non-emergency and toll-free and (ii) local live voice communication over the Public Switched Telephone Network (PSTN) to a third party.

16. The method of claim 15, wherein, while the display is in the password protected screen saver mode, the user is prevented from accessing, via the personal computer, applications other than the communication application and the screen saver application.

17. The method of claim 15, wherein a password protected screen saver display is modified to include the communication application display in response to input from the user.

18. The method of claim 15, wherein the communication application display is continuously displayed while the display is in the password protected screen saver mode.

19. The method of claim 15, further comprising:
   (d) while the display is in the password protected screen saver mode, audibly alerting the user to an incoming live voice communication; and
   (e) while the display is in the password protected screen saver mode, displaying the display of the communication application to permit the user to answer the incoming live voice communication without first disabling the password protected screen saver mode.

20. The method of claim 19, wherein, when the user fails to answer the incoming live voice communication, ceasing the display of the communication application display in lieu of a password protected screen saver display and directing the incoming live voice communication to call coverage.

21. The method of claim 15, wherein step (a) comprises the substeps:
   (i) while the display is in the screen saver mode, determining whether or not defined information is inputted by the user;
   (ii) when the defined information is not inputted by the user, determining whether or not an incoming live voice communication for the personal computer is received;
   (iii) when an incoming live voice communication for the personal computer is received and when the display is in the password protected screen saver mode, alerting, by the personal computer, the user to the incoming live voice communication; and
   (iv) when the defined information is inputted by the user, terminating the password protected screen saver mode, wherein the defined information is a password.

22. A computer readable medium encoded with processor executable instructions operable, when executed by the processor, to perform the steps of claim 15.

23. A personal computer, comprising:
   (a) a display for displaying image information;
   (b) a computer readable medium storing executable instructions; and (c) a processor operable to execute the instructions stored in the computer readable medium to perform:
  (C1) when the display is in a password protected screen saver mode, provide a communication application display, the communication application display permitting a user to perform, via the display, a plurality of the following operations:
    (i) place an active live voice communication on hold;
    (ii) transfer an active live voice communication to another communication device; and
    (iii) conference, over the Public Switched Telephone Network, at least one other communication device into an active live voice communication; and
    (iv) place an ongoing and nonemergency call over the Public Switched Telephone Network to a third party;
  (C2) while the display is in the password protected screen saver mode, receive, from the user, a selection of at least one of operations (i)-(v); and
  (C3) while the display is in the password protected screen saver mode, perform the selected at least one operation, wherein the user is not logged into the personal computer during the performance of operations (C1)-(C3) and wherein, when a command is received from the user to disable break through by the communication application while the display is in the password protected screen saver mode, prohibiting the performance of operation (C1)-(C3).

24. The method personal computer of claim 23, wherein the user selects operation (i).

25. The method personal computer of claim 23, wherein the user selects operation (ii).

26. The method personal computer of claim 23, wherein the user selects operation (iii).

27. The personal computer of claim 23, wherein the processor is operable, while in the password protected screen saver mode, to answer an incoming live voice communication from a third party for the user.

28. The personal computer of claim 23, wherein the processor is operable, while in the password protected screen saver mode, to place at least one of (i) a non-emergency and toll-free and (ii) a local live voice communication over the Public Switched Telephone Network (PSTN) to a third party.

29. The method personal computer of claim 23, wherein, while the display is in the password protected screen saver mode, the user is prevented from accessing, via the personal computer, a plurality of other applications other than a communication application associated with the communication application display.

30. The personal computer of claim 23, wherein a password protected screen saver display is modified to include the communication application display in response to input from the user.

31. The personal computer of claim 23, wherein the communication application display is continuously displayed while the display is in the password protected screen saver mode.

32. The method personal computer of claim 23, wherein the processor is operable further to perform the operations of:
  (C4) while the display is in the password protected screen saver mode, audibly alert the user to an incoming live voice communication; and
  (C5) while the display is in the password protected screen saver mode, display the communication application display to permit the user to answer the incoming live voice communication without first disabling the password protected screen saver mode.

33. The method personal computer of claim 32, wherein, when the user fails to answer the incoming live voice communication, the processor is operable to cease the communication application display in lieu of a password protected screen saver display and direct the incoming live voice communication to call coverage.

34. The method personal computer of claim 23, wherein operation (C1) comprises the sub-operations:
  (i) while the display is in the password protected screen saver mode, determining whether or not defined information is inputted by the user;
  (ii) when the defined information is not inputted by the user, determining whether or not an incoming live voice communication for the personal computer is received;
  (iii) when the incoming live voice communication for the personal computer is received and when the display is in the password protected screen saver mode, alerting the user to the incoming live voice communication; and
  (iv) when the defined information is inputted by the user, terminating the password protected screen saver mode, wherein the defined information is a password.

35. The method of claim 6, wherein a subscriber is associated with the personal computer and wherein no authorization by the subscriber is required for the user, other than the subscriber, to place at least one of (i) a non-emergency and, toll-free and (ii) a local live voice communication over the Public Switched Telephone Network ("PSTN").

* * * * *